US009523067B2

(12) United States Patent
Wallace et al.

(10) Patent No.: US 9,523,067 B2
(45) Date of Patent: Dec. 20, 2016

(54) TEMPERATURE CONTROLLED FERMENTING CONTAINER

(75) Inventors: Allan K. Wallace, Tranmere (AU); Paul Andrew Burge, Oakden (AU)

(73) Assignee: COOPERS BREWERY LIMITED, South Australia (AU)

( * ) Notice: Subject to any disclaimer, the term of this patent is extended or adjusted under 35 U.S.C. 154(b) by 1022 days.

(21) Appl. No.: 13/384,722

(22) PCT Filed: Aug. 16, 2010

(86) PCT No.: PCT/AU2010/001047
§ 371 (c)(1),
(2), (4) Date: Apr. 5, 2012

(87) PCT Pub. No.: WO2011/017777
PCT Pub. Date: Feb. 17, 2011

(65) Prior Publication Data
US 2012/0189736 A1 Jul. 26, 2012

(30) Foreign Application Priority Data

Aug. 14, 2009 (AU) .............................. 2009903827

(51) Int. Cl.
*C12C 13/10* (2006.01)
(52) U.S. Cl.
CPC .................................... *C12C 13/10* (2013.01)
(58) Field of Classification Search
USPC ...................... 99/276, 281, 277, 275; 426/11
See application file for complete search history.

(56) References Cited

U.S. PATENT DOCUMENTS 4,423,670 A * 1/1984 Tenison ........................ 99/275
4,557,186 A * 12/1985 Brown ........................... 99/278
(Continued)

FOREIGN PATENT DOCUMENTS

AU 2008/101298 8/2008
AU 2009/017428 2/2009
(Continued)

OTHER PUBLICATIONS

Automatic Temperature Control in Beer Fermentation, Process Automation Instrumentation, Issue 3rd, Mar. 31, 1993.
(Continued)

*Primary Examiner* — Dana Ross
*Assistant Examiner* — Renee Larose
(74) *Attorney, Agent, or Firm* — Greenblum & Bernstein, P.L.C.

(57) ABSTRACT

The invention provides a fermentation arrangement for fermenting a brew including a vessel having an internal volume adapted to support fermentation of a brew therein, a settable energy device arranged to deliver and extract energy respectively to and from the internal volume of the vessel, and a temperature controller device for controlling the amount and period of energy delivery and extraction of the settable energy device to achieve a temperature within the vessel according to one or more modes of operation, wherein the modes of operation include at least a storage mode associated with the end of fermentation, and the setting of energy in the storage mode is such as to maintain the fermented brew in a stable state. End of fermentation may be detected by measuring for temperature stratification, using temperature sensors positioned at different heights of the brew.

19 Claims, 11 Drawing Sheets

(56) References Cited

U.S. PATENT DOCUMENTS

| | | | |
|---|---|---|---|
| 4,754,698 A * | 7/1988 | Naish | 99/275 |
| 5,364,639 A * | 11/1994 | MacLennan et al. | 426/16 |
| 5,365,830 A * | 11/1994 | MacLennan et al. | 99/276 |
| 6,032,571 A * | 3/2000 | Brous et al. | 99/277.2 |
| 6,629,490 B1 * | 10/2003 | Lu et al. | 99/276 |
| 6,889,598 B2 * | 5/2005 | Wroblewski | 99/275 |
| 7,401,545 B2 * | 7/2008 | Hu et al. | 99/281 |
| 7,685,715 B2 * | 3/2010 | Rule | 29/890.031 |
| 7,748,314 B2 * | 7/2010 | Hahm et al. | 99/468 |
| 2004/0129144 A1 * | 7/2004 | Beadle | 99/275 |
| 2006/0138177 A1 * | 6/2006 | Wauters et al. | 222/386.5 |

FOREIGN PATENT DOCUMENTS

| | | |
|---|---|---|
| WO | 2008/101298 | 8/2008 |
| WO | 2009/017428 | 2/2009 |

OTHER PUBLICATIONS

Chinese Office action, dated Dec. 25, 2012, along with an english translation thereof.

\* cited by examiner

TEMPERATURE CONTROLLED FERMENTING CONTAINER

PRIORITY CLAIM

This application claims priority from Australian Patent Application No 2009903827, the entire contents of which are hereby incorporated by reference.

FIELD OF THE INVENTION

This invention relates to a fermenting arrangement and in particular an arrangement suitable for use by non-professional home-based brewers.

BACKGROUND

The brewing of beers including alcoholic and non-alcoholic beers has been a personal and home-based pastime for a very long time. To cater for first-time brewers, while at the same time providing for repeat brewers, there exist kits containing all the relevant ingredients and instructions to facilitate the making of beer. Kits of this type are sold from specialist and supermarket outlets. Home brew ingredient kits typically do not include the containers within which the brew is to be fermented, air locks, taps, bottles, caps, and other equipment as are required. The quantity of ingredients in the kits and the volume of the compatible arrangement is matched and supplied primarily to satisfy the home brew marketplace. Home-based brewers obtain the apparatus and starter kits which are sold separately from a variety of suppliers, fellow brewers and in some cases professional brewers. More serious home brewers acquire the highest quality of individual ingredients, as well as a variety of the many different home brew kits available from a variety of homebrew kit manufacturers, as well as alternative and supplementary ingredients with which to experiment and perfect home brew products to satisfy their particular taste. Indeed, some serious home brewers acquire and use industrial quality apparatus when available.

A typical first-time home brewer will tend to purchase a home brew apparatus kit (in addition to an ingredient kit) containing a 30 liter plastic fermenter, lid and rubber 'O' ring, a tap, washer and sediment reducer, an airlock and rubber grommet, a thermometer, a hydrometer and a bottling valve and tube. These items can be reused as long as appropriate sanitisation procedures are followed after each use and prior to each use.

All starter kits contain written instructions and some contain audiovisual recordings to assist the first-time user of those kits. Additional items such as bottles and caps will be required and are sometimes supplied in starter kits.

The largest item in those kits is the fermenter vessel and its associated lid typically accompanied by a seal of some description. The fermenter will also have an aperture at its base for the attachment of a tap so as to allow for the draining of liquid from the vessel and the lid will have an aperture suitable for fitment of an airlock which allows gases to be released from the volume of the fermenter vessel during the fermenting process.

The tap is typically a simple stop cock valve which is an OEM item typically made of food grade material, preassembled, and not designed for disassembly.

The airlock and its associated grommet is fitted to the lid of the fermenter vessel to allow gases created during the fermenting process to escape, while preventing atmospheric gases entering the interior of the fermenter vessel. The airlock in this arrangement works in conjunction with a seal between the lid and the body of the fermenter vessel to ensure that the only escape route for gases is via the airlock, and also to ensure atmospheric gases remain external of the fermenter vessel. The vessel and lid thus are preferably dimensionally compatible so that the seal performs its primary function. Indeed, home brewers do not always provide a good working seal which can allow gases to escape without flowing through the air lock. An undesirable consequence of that is that the brewer may believe that fermentation has ceased because of the lack of gas flow through the airlock, when in fact fermentation is still on going, but the gases are escaping via a poor seal. Incorrect determination of the end of fermentation is a common mistake for home brewers. Yet further, the seal becomes just another of the equipment elements that requires maintenance and appropriate sanitisation.

All the above-mentioned equipment, ingredients, and methods of brewing are available to the home-based brewer, yet these brewers still commonly produce poor quality and poor tasting batches of homebrew. This can be due to one or more of many reasons, a non-exhaustive list including: incorrect determination of the end of fermentation, incorrect or misinterpretation of temperature readings, lack of understanding of the fundamental fermentation process, poor timing of the one or more periods associated with the fermentation process which itself may be caused by the inability to be constantly or even periodically monitor the fermentation process, incorrect or lack of understanding of the importance of maintaining particular minimum and maximum temperatures, inability to consistently determine and apply all various parameters required to be monitored during the fermentation process, and the sheer complexity of the brewing process inhibiting some people who would otherwise desire or benefit from making their own non-alcoholic or alcoholic beverage in a home or nonprofessional environment.

The various problems associated with existing apparatus and their use are minimised or eliminated or at least an alternative is provided by the invention disclosed herein.

SUMMARY OF THE INVENTION

Accordingly, in a first aspect of the present invention, there is provided a fermentation arrangement for fermenting a brew including:
  a vessel having an internal volume adapted to support fermentation of a brew therein;
  a settable energy device arranged to deliver and extract energy respectively to and from the internal volume of the vessel; and
  a temperature controller device for controlling the amount and period of energy delivery and extraction of the settable energy device to achieve a temperature within the vessel according to one or more modes of operation, wherein the modes of operation include at least a storage mode associated with the end of fermentation, and the setting of energy in the storage mode is such as to maintain the fermented brew in a stable state.

The modes of operation may further include a fermentation mode associated with the fermentation of the brew, and a yeast development mode to allow yeast to develop at the start of the brewing process The arrangement may further include an end of fermentation detector, for determining end of fermentation of the brew, and wherein the storage mode is associated with the end of fermentation such that the storage mode is entered a predetermined time after end of fermentation is detected. End of fermentation may be detected using a first temperature sensor positioned at a first height of the container, and a second temperature sensor positioned at a second height of the container, measuring a difference between the temperatures sensed by the first and second temperature sensors and a temperature sensed by the second temperature sensor, and comparing the difference to a threshold difference—if the difference is greater than the threshold difference, end of fermentation is detected.

A third temperature sensor may also be provided, for measuring the ambient temperature external to the arrangement. This may be important in determining the exact end of fermentation detection methodology to use—e.g. if the ambient temperature is significantly different from the brew temperature, a heating or cooling pulse may be provided prior to measuring the temperature difference. Alternatively, the threshold difference may be adjusted depending on the ambient temperature.

In a second aspect of the present invention, there is provided a method of using a fermentation arrangement for fermenting a brew according to the first aspect of the present invention, the method including:

controlling the energy delivered to or extracted from the internal volume of the vessel;

controlling the amount and period of energy to achieve a temperature within the vessel according to one or more modes of operation, wherein the modes of operation include at least a storage mode associated with the end of fermentation, and the setting of energy in the storage mode is such as to maintain the fermented brew in a stable state.

The method may further include implementing a fermentation mode associated with the fermentation of the brew during which there is an adjustment of the temperature of the brew to a predetermined temperature and substantially holding that temperature for a predetermined period.

In some embodiments, the method may further include:

measuring a temperature difference between a temperature at a first height of the brew and a temperature at a second height of the brew; and identifying end of fermentation if the temperature difference is greater than a threshold difference.

In a further aspect of the present invention, the method may further include:

forming frozen brew about a portion located at the internal base of the vessel, and releasing the frozen brew from the portion by reheating the brew so as allow the frozen brew to float to the top of the brew to thereby facilitate removal of the frozen brew.

In a further aspect of the present invention, there is provided a fermentation arrangement for fermenting a brew including:

a vessel having an internal volume adapted to support fermentation of a brew therein;

a settable energy device arranged to deliver and extract energy respectively to and from the internal volume of the vessel; and a temperature controller device for controlling the amount and period of energy delivery and extraction of the settable energy device to achieve a temperature within the vessel according to one or more modes of operation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents.

For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF THE FIGURES

An illustrative embodiment of the present invention will be discussed with reference to the accompanying drawings wherein.

DETAILED DESCRIPTION

Figure 1:
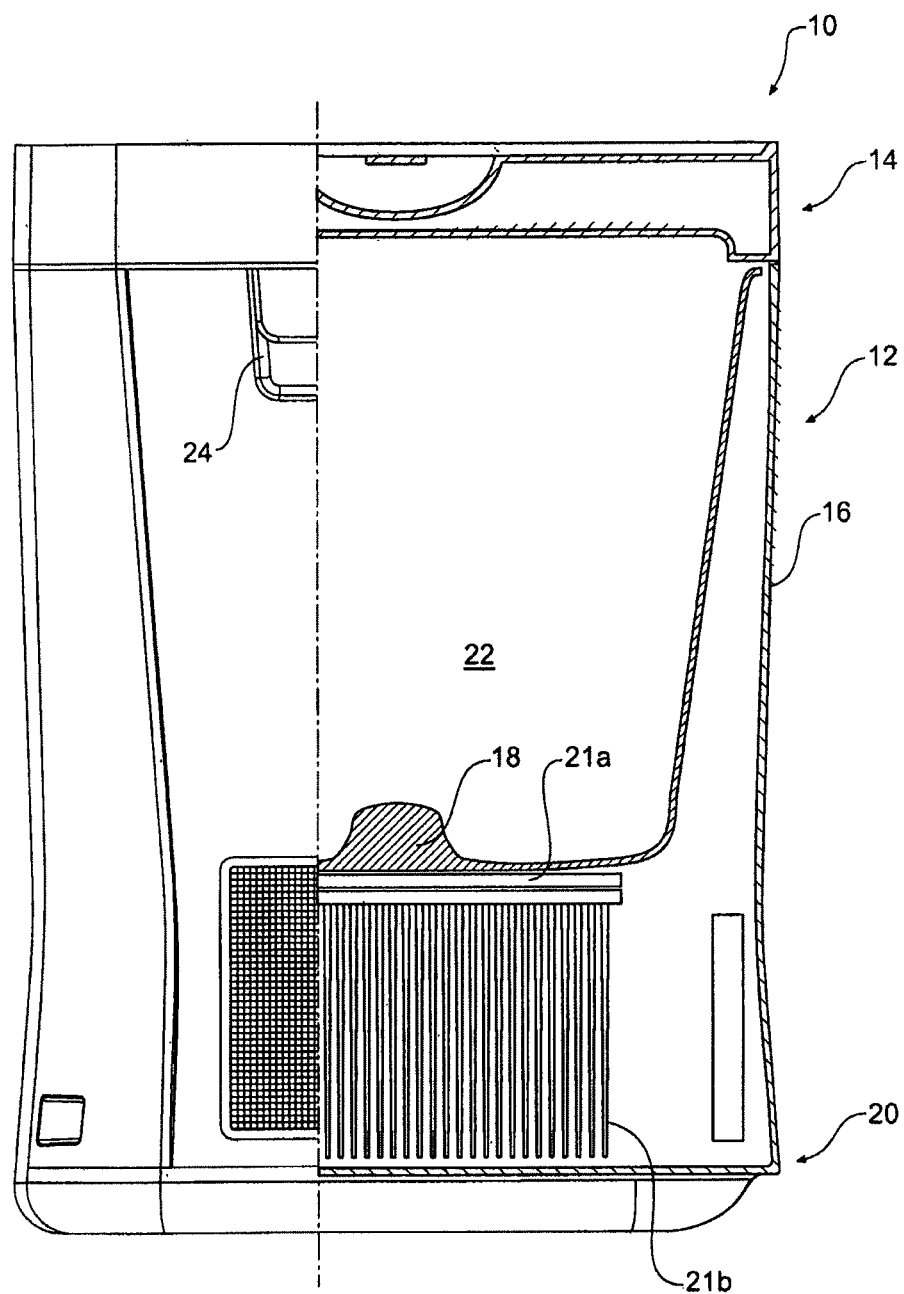
FIG. 1 depicts a partial cut away view of a fermenting vessel.

A fermenting arrangement for fermenting a brew is described which only requires the addition of the ingredients for a preferred brew outcome and the setting of a program to both ferment and store the fermented brew until it is drawn from the arrangement into a suitable container or containers for secondary fermentation.

The basic ingredients of a beer brew include: water, malt (or malt extract and include dark, standard, light, wheat, amber), hops, dextrose/sugar, and yeast. The types of malt and yeast determine the type of beer, such as, lager, ale, stout, and even ginger beer.

Light alcohol beer (or acceptably low alcohol in the range of 2.2%-3.2% Alcohol By Volume ABV) uses less sugar than used in higher alcohol beer pre-fermentation mixes. Mid-strength alcohol beer having alcohol in the range 3.3%-4.2% ABV uses more sugar than light and less that Full Strength alcohol beer which has alcohol above 4.3% ABV.

Home brewers are well known for varying the quantities of the described ingredients to suit their taste or the perceived taste of the product to others, the head forming characteristics, the colour, density and the alcohol range.

Different beers are generally produced using the required pre-fermentation mix and creating an environment within which the mix will ferment. A suitably sized a vessel having an internal volume adapted to support fermentation of a brew therein is used. Hot water at an appropriate temperature is added to the mix to start the fermentation process (sometimes referred to as the log/lag period), and in this embodiment a settable energy delivery device is arranged and positioned to deliver energy to the internal volume of the vessel. A temperature detection and energy delivery control is used for controlling the amount and period of energy delivery to the internal volume of the vessel. In this way, the internal temperature of the vessel can be maintained at a desired temperature, which may vary depending on the specific mode of operation of the arrangement.

In this embodiment, the temperature of the brew is maintained in accordance with various 'zones' or 'modes' of operation (the terms 'zones' and 'modes' are used substantially interchangeably in this specification). In this embodiment, the brew is maintained substantially at a set temperature for each zone, and as the brew progresses, it proceeds from one zone to the next. The moment to proceed from one zone to the next may simply be determined based on the time elapsed since a start time for the brew. Alternatively, features of the brew may be measured, and an algorithm applied (e.g. to determine the rate of fermentation), in order to determine when the brew should progress to the next zone. The zones used for this implementation are:

Zone 1 Zone 1 for yeast development;
Zone 2 for fermentation of the brew;
Zone 3 once end of fermentation is detected or the brew is otherwise considered to be complete, and this is signalled to the user; and
Zone 4 during which storage conditions are provided.

Figure 6:
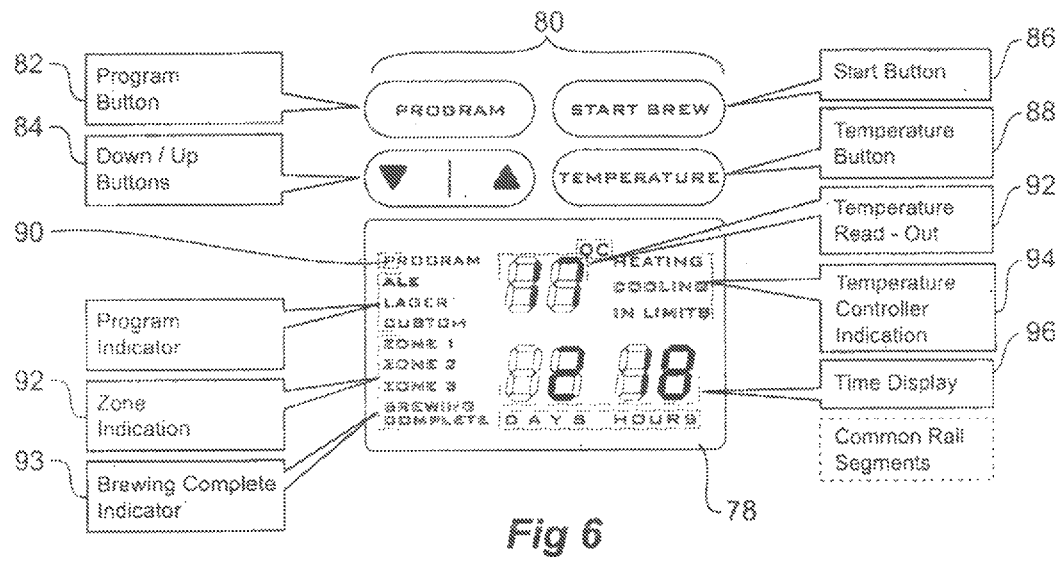
FIG. 6 depicts a pictorial representation of the control device operating interface.
Figure 7:
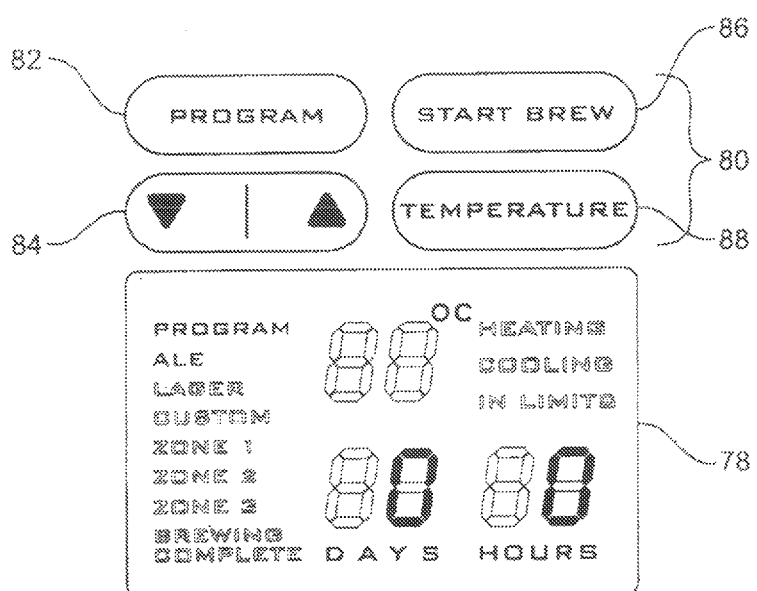
FIG. 7 depicts a pictorial representation of the control device operating interface in a state ready for operation.

The exact times and temperatures for each zone can vary within the scope of the present invention. For example, in this embodiment, the fermentation arrangement is preset to provide two different fermentation programs, one for producing an Ale brew and one for producing a Lager brew. Each of these programs specifies appropriate times and temperatures for the above zones. Furthermore, the arrangement allows a user the option of setting their own 'Custom' program, for more experienced home-brewers, wherein they can select their own times and temperature for each zone, depending on the type of brew they wish to create The operation of the fermentation arrangement will be described and illustrations of the visual indications provided on the arrangement are shown in FIGS. 6 and 7 while explanation of the zones is assisted by FIGS. 9, 10 and 11.

In Zone 1, the brew mix and water is brought to a predetermined temperature for a period of 12 hours, which allows the yeast to develop. In the case of a typical Ale and Lager the temperature is 24° C. This temperature is changeable for the Custom program. Once Zone 1 finishes (i.e. 12 hours elapse), the arrangement enters Zone 2.

In Zone 2, the brew is brought to a specific temperature for the type of beer being brewed. This temperature can vary quite widely, depending on the type of brew. Zone 2 ends either when end of fermentation is detected by analysing the brew, or after a pre-determined time (e.g. X number of days) has elapsed.

Preferably, the transition from Zone 2 to Zone 3 is determined by detecting that fermentation has ended. Accordingly, the arrangement preferably includes a means to accurately determine the end of fermentation. End of fermentation can be measured in a number of ways—one manual method is to measure the specific gravity of the brew and note when it is stable over a period of about 24 hours.

In this embodiment, end of fermentation is determined by measuring the temperature internally of the vessel (in one particular embodiment the temperature of the fermenting brew) and determining if a predetermined temperature pattern occurs. More details of the measurements and the determination of the temperature pattern will be provided later in the specification.

The temperature during Zone 2 (the fermentation mode), for fermentation of a typical Ale beer, should generally be about or within the range 20° C. to 27° C. Fermentation at 20° C. may take 7 to 14 days from the beginning of Zone 1.

For a typical Lager beer, the temperature during Zone 2 should generally be about or within the range 13° C. to 18° C. Fermentation at 13° C. may take 7 to 21 days from the beginning of Zone 1. Of course, these values may vary depending on the particular preferences of the home brewer, and the type of beer being brewed.

The arrangement in this embodiment is programmed to have a maximum period for Zone 2 measured from the beginning of Zone 1, for circumstances when end of fermentation is not detected. End of fermentation may not be detected for a number of reasons, such as if the yeast is not active for some reason, the ambient temperature adversely affects the temperatures delivered to the fermenting brew, or a range of other factors. If no end of fermentation is detected by the end of a predetermined time out period (e.g. 21 days), the arrangement is programmed to enter Zone 3.

During Zone 3, after end of fermentation is detected, the internal temperature is held at about 18° C. for 48 hours, or until the arrangement is manually turned off (whichever occurs first). During Zone 3, an indicator is preferably used to alert the home brewer that fermentation has completed, and the brew is ready for bottling, which allows secondary fermentation can then take place.

However, if the arrangement is not manually turned off during Zone 3 or after the 48 hours mentioned, Zone 4 is entered. If Zone 4 is entered, this generally means that the home brewer has not been able to attend to bottling their brew, even though the fermentation process is complete. It may indicate that they have forgotten about the brew, or that they are simply unable to attend to it due to absence (e.g. illness or holiday) or simply due to a lack of time. Accordingly, Zone 4 provides a storage mode for the brew to maintain the brew in a stable state.

Accordingly, during Zone 4, the temperature of the fermented brew is driven to a cold setting (e.g in this embodiment −1 degrees C. or similar). This substantially maintains the brew in a stable state, such that it is safe for human consumption at some future time (whether or not there is further processing of the brew or not).

Apparatus according to an embodiment of the present invention is depicted in FIGS. 1 to 5. FIG. 1 is a side partially cut away view of fermenting arrangement 10, including a fermenting vessel 12 and a lid 14. The vessel of the arrangement includes an insulated substantially vertical wall 16, showing a modified frustoconical-shaped protrusion 18 at the base 20 of the internal volume 22 of the vessel 12. The vessel has an internal volume which in this embodiment is sufficient to house at least 23 liters of brew mixture with space above the brew mixture to allow a volume of froth generated during the fermenting process to be contained within the total internal volume. Handle portions 24 are partly shown in FIG. 1, and are shown more clearly in other figures. Also shown pictorially (but physically in thermal contact with the protrusion 18) are an energy delivery and extraction device 21a, and an associated heat exchanger 21b. Details of these components will be described later in the specification.

The shaped protrusion 18 is made of an energy transmissive material such as, for example, aluminium. The protrusion 18 is located in thermal transmission proximity to the energy delivery and an energy extraction device 21a.

Figure 2:
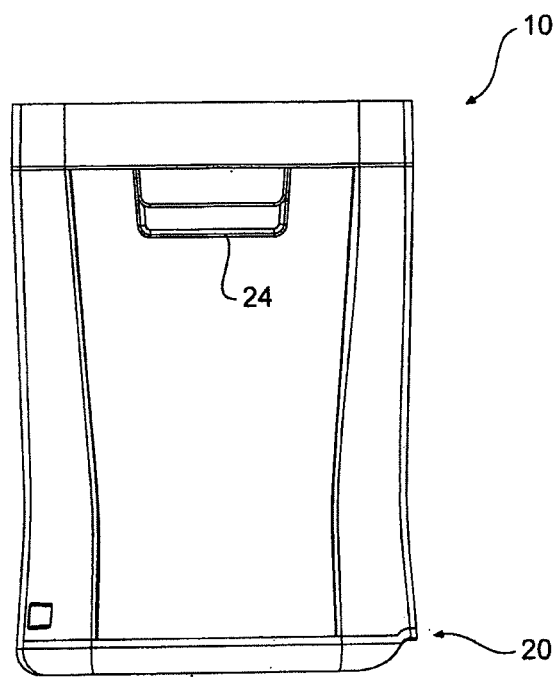
FIG. 2 depicts a side view of the fermenting vessel of FIG. 1.
Figure 3A:
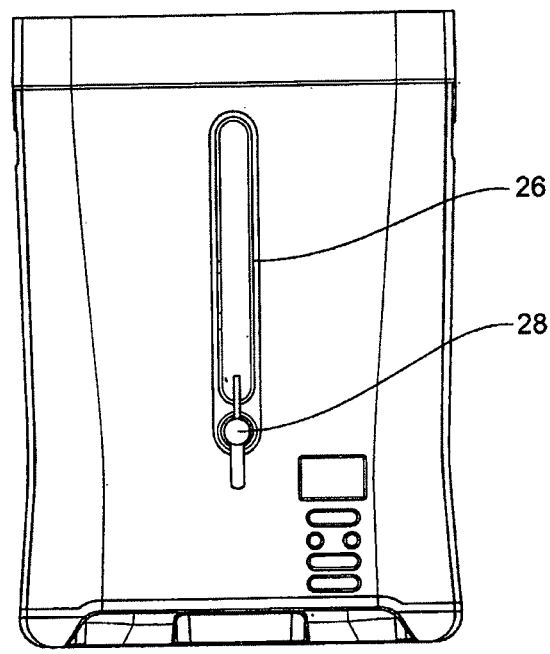
FIG. 3A depicts a front view of the fermenting vessel of FIG. 1.
Figure 3B:
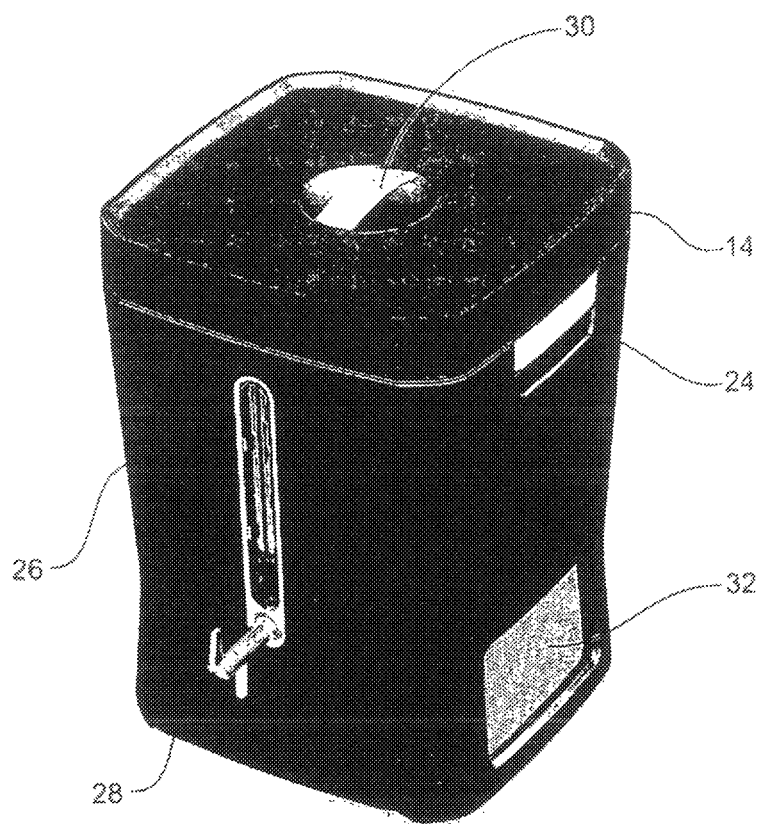
FIG. 3B depicts a perspective view of the fermenting vessel of FIG. 1.

FIG. 2 shows a side view of the fermenting vessel and FIG. 3a shows a front view of the fermenting vessel. FIG. 3a particularly shows an observation window 26 having an elongated shape vertically arranged on the outside surface of the vessel 12. Immediately below the observation window 26 is located a dispensing tap 28 which is depicted in a perspective view on the side of the vessel as shown in FIG. 3b. Also depicted in FIG. 3b is the observation window 26, handle portions 24 which are repeated on the opposite side of the vessel but not shown, and a handle 30 associated with the lid 14. Further depicted in FIG. 3b is an airflow vent 32 into and out of which flows air used by the heat exchanger 21b associated with the energy delivery and an energy extraction device 21a.

Figure 4:
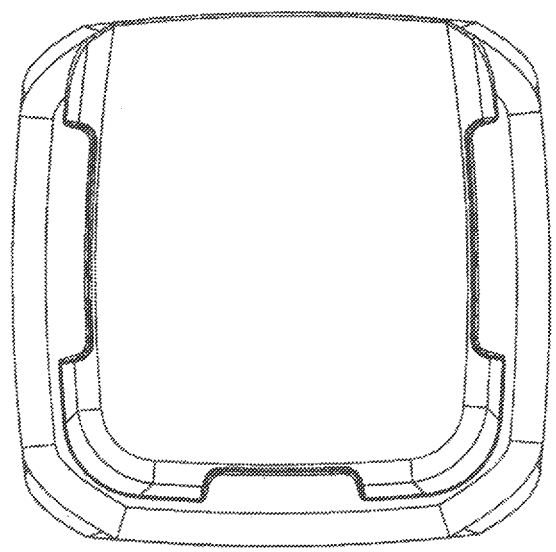
FIG. 4 depicts a bottom view of the fermenting vessel of FIG. 1.

FIG. 4 depicts a bottom view of the fermenting vessel. Although not shown the outer dimension of the vessel is about 405 mm square but this is an indicative size only.

Figure 5:
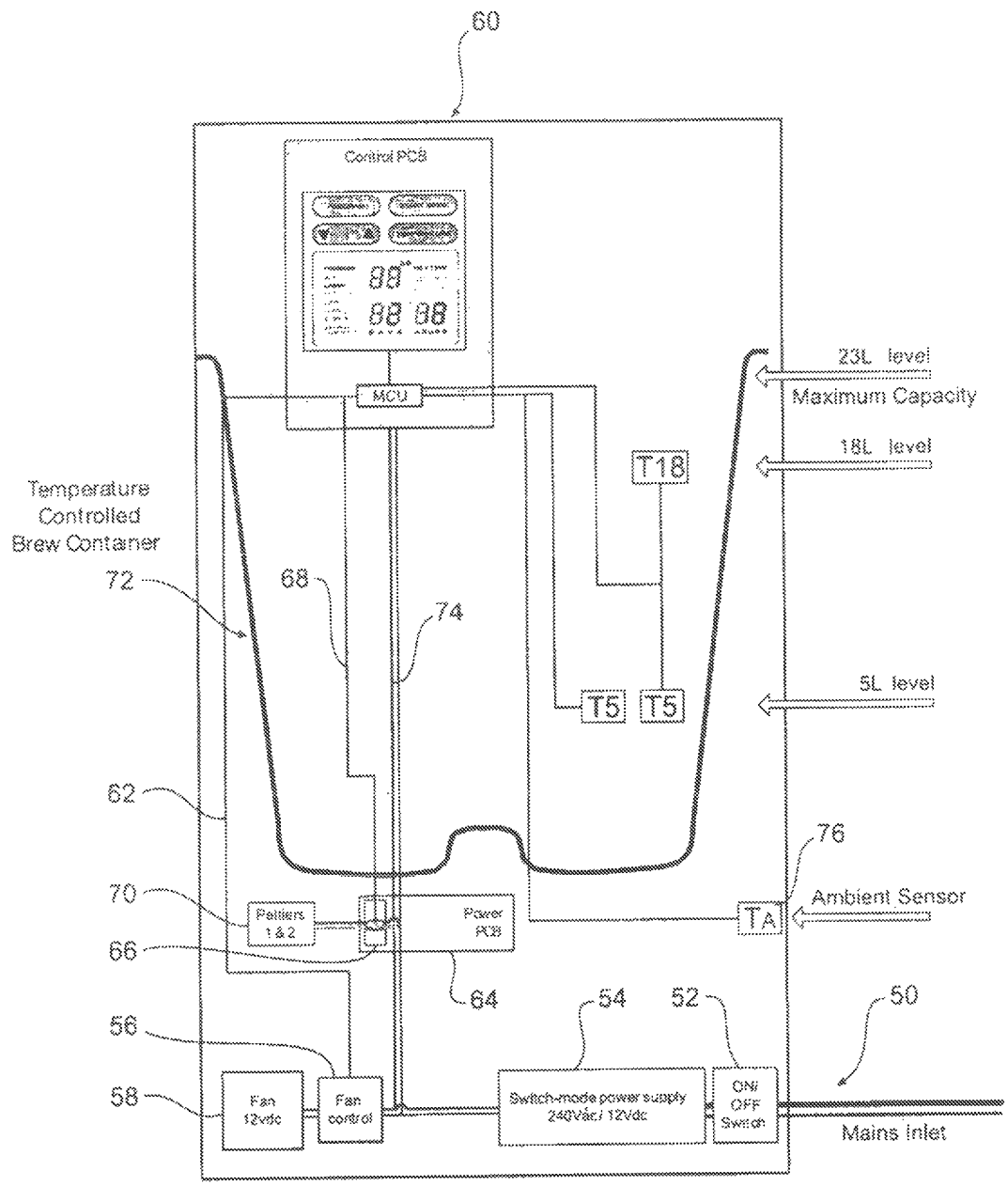
FIG. 5 depicts a pictorial representation of the internal volume of the vessel and associated functional devices and elements, including temperature sensors.

FIG. 5 provides a pictorial representation of the internal elements of the vessel, which are arrayed on the figure primarily for clarity purposes, rather than representing the precise location of those elements. A mains power inlet 50 is adapted for power of various international types including the Australian type being 240 V AC, 50 Hz plug or further as another example, US 110 V AC, 60 Hz. Immediately adjacent the inlet 50 is a suitable ON/OFF switch 52, and also connected is a switch mode power supply 54 that converts the input mains power to 12 V DC. DC power is used throughout the arrangement to power various devices therein. A switch mode power supply is but one example of a suitable power conversion device which may, for example, include a transformer with a rectifier circuit and ripple control. One of the many powered devices associated with the arrangement, one or other of which may be located external of the arrangement housing, but not shown in the figures, is a fan control element 56 which controls a 12 V DC fan 58. Control of the fan control element is provided by the control device 60 (more about which will be described later in the specification) via control line 62.

12 V DC is also supplied to DC power distribution board 64 which in turn provides DC to an input to a relay 66 which is controlled from the control device 60 by control line 68 to power at least one but preferably two settable energy devices 70 (also referred to in FIG. 1 as the energy delivery and an energy extraction device 21a) arranged to deliver energy to the internal volume of the vessel. The vessel is pictorially depicted as the volume within the cross-sectional depiction of an internal wall 70 shown in FIG. 5.

In this embodiment the energy delivery device includes two Peltier cells (in this embodiment each cell is a TEC 1-1270670 electric device). The DC power distribution board 64 also in turn provides DC to the control device 60 via power line 74. Of course, the settable energy device could vary in different embodiments of the invention, and compressor-based systems may be used in other embodiments.

The control device 60 has multiple functions, some of which are supported by temperature sensors Ta 76 (which is an ambient temperature sensor having exposure to ambient conditions external of the vessel) and T18 and T5 (located in the vicinity of the 18 and 5 liter levels respectively of the internal volume of the vessel). The location of the temperature sensors is provided by way of example and other locations may be possible. Temperature sensors in this embodiment are thermopiles, although different embodiments may use different temperature sensors. Generally the types of thermopiles chosen preferably provide plus and minus 0.05° C. accuracy, preferably within the range 10 to 24° C., even though a range above and below the given range of temperature sensing capacity is possible. The choice of temperature sensor can be determined by price and availability, as the parameters of operation do not require absolute accuracy. If required for the type of sensor (such as a thermistor) they should preferably be matched.

The different sensors Ta 76, T18, and T5 are used for the purposes of both temperature control, and end of fermentation detection. For temperature control, the T5 sensor is used as a reference as to whether the brew temperature is higher or lower than desired (for the particular mode (or zone) the arrangement is in). The brew is cooled or heated respectively depending on the temperature measured by the T5 sensor, to bring it closer to the desired temperature.

For detecting end of fermentation, various methodologies could be used. However, for this embodiment, the arrangement measures the difference in the temperatures measured by T18 and T5—i.e. it compares the temperatures at different heights of the brew. This utilises the end of fermentation detection method and disclosed in PCT/AU2008/000238 (WO 2008/101298) entitled Brewing Apparatus and Method in the name of Coopers Brewery Limited the owner of the invention disclosed herein. The entire specification of PCT/AU2008/000238 (WO 2008/101298) is hereby incorporated into this specification by reference. In particular, it has been determined that, once the fermentation is complete, the temperature of a brew (such as beer) shows a tendency to stratify in horizontal layers. However, the activity of fermentation disrupts the tendency of the brew to stratify. Accordingly, the brewing apparatus comprises at least 2 temperature sensors positioned to measure temperature difference between the temperature at a first height of the brew and the temperature at a second height of the brew. End of fermentation is identified when the temperature difference is greater than a threshold difference.

In this embodiment, the output of the temperature sensors T5 and T18 is used to determine end of fermentation. In particular, the difference in temperature between T18 and T5 (temperature sensors at different heights of the brew) is measured and directly outputted as a voltage (V0), wherein the voltage application and sensing circuit should preferably be capable of achieving temperature accuracies of + or −0.05° C. difference between sensors T18 and T5. The difference in the temperatures is indicative of a stratification temperature $T_{STRAT}$. The temperature difference ($T_{STRAT}$ about zero) indicates that fermentation is ongoing, because the brew is being circulated (due to the heating effect of fermentation and the natural cooling that occurs near the top of the mixture) within the vessel and temperature is effectively becoming uniform through out the vessel. However, if $T_{STRAT}$ exceeds a threshold difference, then this indicates end of fermentation has occurred.

Further details of various detection algorithms based on a measure of temperature difference (e.g. $T_{STRAT}$) are disclosed in PCT/AU2008/000238 (WO 2008/101298) The exact detection algorithm to apply may vary depending on various factors, such as the type of brew, and the ambient temperature. In particular, the detection algorithm may be altered depending on the ambient temperature relative to the desired brew control temperature, because the heating or cooling effect of the settable energy device may effect the stratification). For example, different detection algorithms, or different threshold values for $T_{STRAT}$ may be applied for each of the following cases:

The brew control temperature is much greater that the ambient temperature.
The brew control temperature is slightly greater than the ambient temperature.
The brew control temperature is slightly less than the ambient temperature.
The brew control temperature is much less than the ambient temperature.

The detection process will likely be similar for all of the above cases, but the actual values of the temperature differences and time will be different for each case, and the detection process may make additional use of a comparison between the ambient and T5 sensor assists in determining which case is relevant. In some instances, the heating or cooling effect of the settable energy device may be temporarily removed by the control device 60, as part of the end of fermentation detection process, or alternatively a heating or cooling effect may be applied prior to measuring the temperature difference.

The end of fermentation detection is used to indicate that the arrangement is ready to proceed from Zone 2 (fermentation mode) to Zone 3 (for end of fermentation). In this embodiment, the arrangement does not transition to Zone 3 until two consecutive positive detections are made for end of fermentation. At this time, an indication may also be presented to the brewer indicating that brewing is complete, and the brew is ready for bottling.

Turning again to the control device 60, this device 60 has an associated display, which is shown in greater detail in FIGS. 6 and 7. The display in this embodiment includes a dedicated display 78 and predetermined identifier labels/buttons 80, although clearly other display formats may be used. The dedicated display 70 in this embodiment is a liquid crystal display having a mixture of fixed and variable visual areas, and the labels/buttons are built into the panel with a flush outer surface which are backlit as and when required by the program to assist the user to operate the arrangement. The labels/buttons include a PROGRAM button 82, UP and DOWN buttons 84, a START BREW button 86, and a TEMPERATURE button 88.

The display 78 includes a program indicator 90 which is displayed all the time and designated PROGRAM under which are displayed at the appropriate times ALE, LAGER, and CUSTOM, also under which is a zone indicator region 92.

Below the zone indicator region is a BREWING COMPLETE indicator 93, for indicating to the user when the brew is finished. The BREWING COMPLETE indicator 93 will typically be lit when end of fermentation is detected, as described above.

The display 78 also has a numeric temperature read out 92 and that temperature controller indication 94 which displays whether the arrangement is actually HEATING, COOLING, and IN LIMITS since the current temperature is not displayed during normal operation. Also available in display 78 is a numeric time display 96 in hours and days format.

The display 78 will only display details for one program at a time, either during operation of that program or during the programming of the arrangement prior to commencing a brew. As a program runs, it sequences through each identified zone of the fermentation process for either a predetermined period, or when a relevant event is detected (e.g. end of fermentation).

The display 78 provides a zone indication, which displays the current zone as appropriate during the running of a program, or also during editing of a program (such as by using the CUSTOM function of this embodiment, where a user can manually edit the temperature or duration for a particular zone). As described previously, Zone 1 represents the lag/log zone of yeast development, Zone 2 is the fermentation zone, and Zone 3 is indicated at the end of the fermentation phase or at a point in the process after a predetermined time has elapsed without end of fermentation being detected, and then further indicates that bottling may commence. For Zone 4 (storage mode), this display 78 does not provide a specific indicator, but when the arrangement is in Zone 4 none of the zones 1 to 3 will be highlighted but the BREWING COMPLETE indicator 93 will flash denoting end of fermentation (if two end of fermentation events have been detected). If the program progresses from Zone 2 to Zone 3 due to a time out, there will be no BREWING COMPLETE indication—if the arrangement is indicating Zone 3 but not BREWING COMPLETE, this may indicate a potential problem to the user, because end of fermentation has not been detected.

The temperature indicator will be displayed as a 2 digit indicator display value. In this embodiment, the range of values displayed to the user is limited to the range 0° C. to 40° C. However, internally, the arrangement can determine temperatures outside the displayed range. During the set up of the CUSTOM program the display will show the set temperatures of the zone the user has determined or can display as the temperatures are adjusted using the UP and DOWN buttons.

The time display 96 shows the elapsed time from the commencement of the brew, in 2 digit day and 2 digit hour formats.

To assist the user to know which functions are available at various stages, operation of the particular buttons that can be used during a particular state is assisted by backlighting the relevant button for easier operator awareness.

Figure 8:
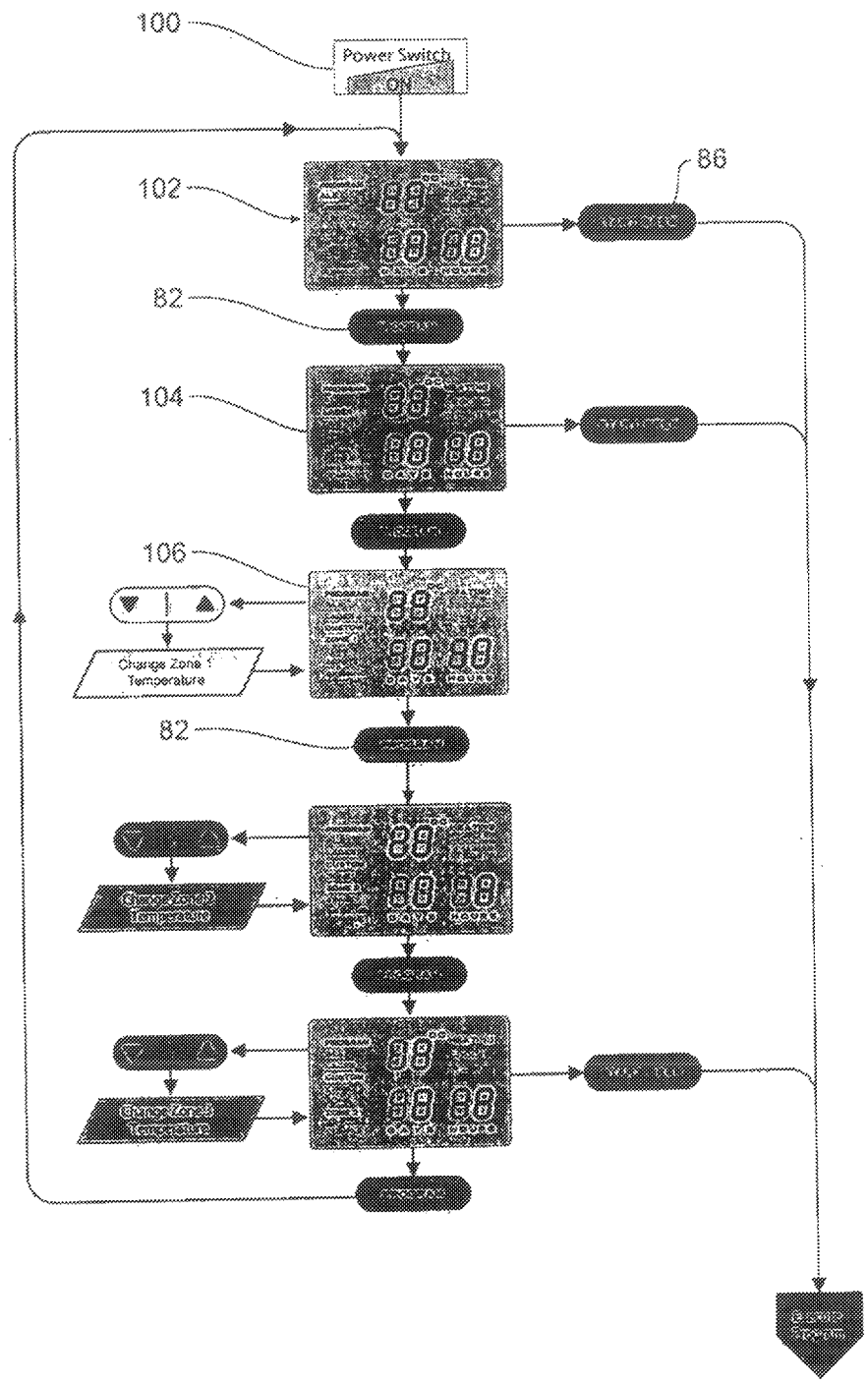
FIG. 8 depicts a flow diagram of the operation of the control device of the fermenting arrangement.

Turning now to FIG. 8, this flow illustrates the process of setting up a brew program. Typically, this will be performed after the user has mixed the appropriate ingredients in the vessel 12. When the arrangement is first turned on 100, the default program display is the ALE program 102. FIG. 7 depicts the user interface configuration when the unit is turned on. If the user wants to commence the ALE program (for an ale brew), then they depress the START BREW button 86.

However, the user can select different programs by pressing the PROGRAM button 82 successively. In this embodiment, the next press of the PROGRAM button 82 shifts the program to the LAGER program 104. If the user wants to commence the LAGER program (for a lager brew) then they depress the START BREW button 86.

Another press of the PROGRAM button 82 allows the user to select a CUSTOM program 106. In this program, the user can review all the temperatures for all the zones, and it is possible for them to change the temperature for some of the zones. Such a process ensures that the user has taken note of the temperature settings, or has checked they actually conform to their desired temperature sequence.

In the CUSTOM program, the Zone 1 temperature is preset to 24° C. and the ZONE 1 indicator is illuminated. If the user wishes to adjust the Zone 1 temperature, they can do so (within acceptable bounds) by pressing the down/up button 84, which will change the temperature displayed accordingly. Note, however, that in some embodiments, the arrangement will not permit the adjustment of the temperature during Zone 1. In any case, pressing the PROGRAM button 82 steps forward to present the Zone 2 temperature and illuminates the ZONE 2 indicator, and the user can edit the Zone 2 temperature. The user can similarly step forward and edit the Zone 3 temperature. Finally, pressing the START BREW button 86 will commence the CUSTOM program, or pressing the PROGRAM button 82 again will take the user back to the ALE program.

The following table provides example programs, as described above, which are used in this embodiment:

|  |  | Zone 1 | Zone 2 | Zone 3 | Zone 4 |
|---|---|---|---|---|---|
| Ale Program |  | 24° C. | 20° C. | 18° C. | <4° C. |
| Duration |  | 12 hours | at least 5 days | 2 days |  |
| Lager Program |  | 24° C. | 13° C. | 18° C. | <4° C. |
| Duration |  | 12 hours | at least 5 days | 2 days |  |
| CUSTOM PROGRAM | Default | 24° C. | 20° C. | 18° C. | <4° C. |
|  | Adjustable | 4° C.-24° C. | 4° C.-24° C. | 4° C.-24° C. | — |

Figure 9:
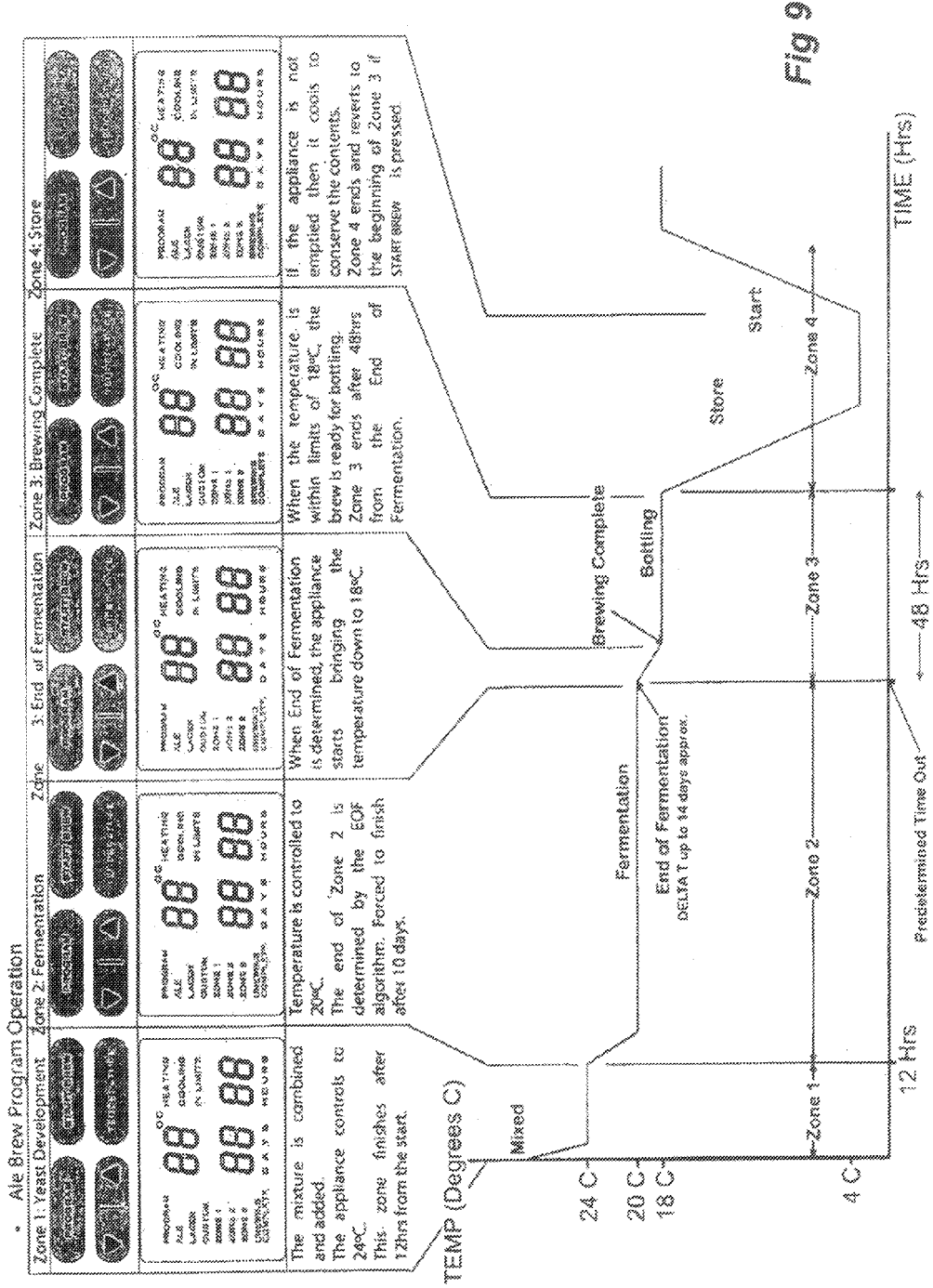
FIG. 9 depicts a series of displays of the Ale brew program in operation.
Figure 10:
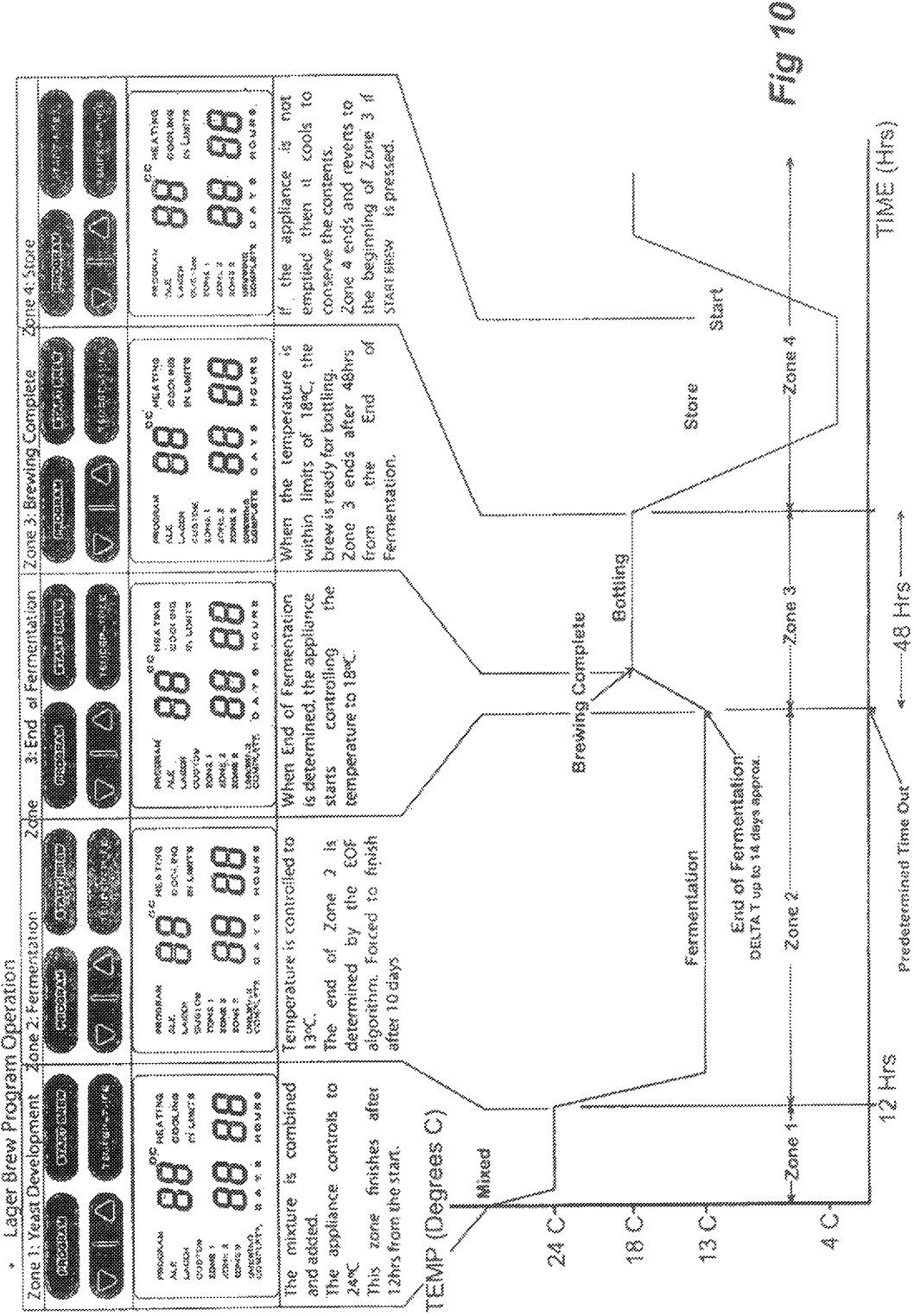
FIG. 10 depicts a series of displays of the Lager brew program in operation.
Figure 11:
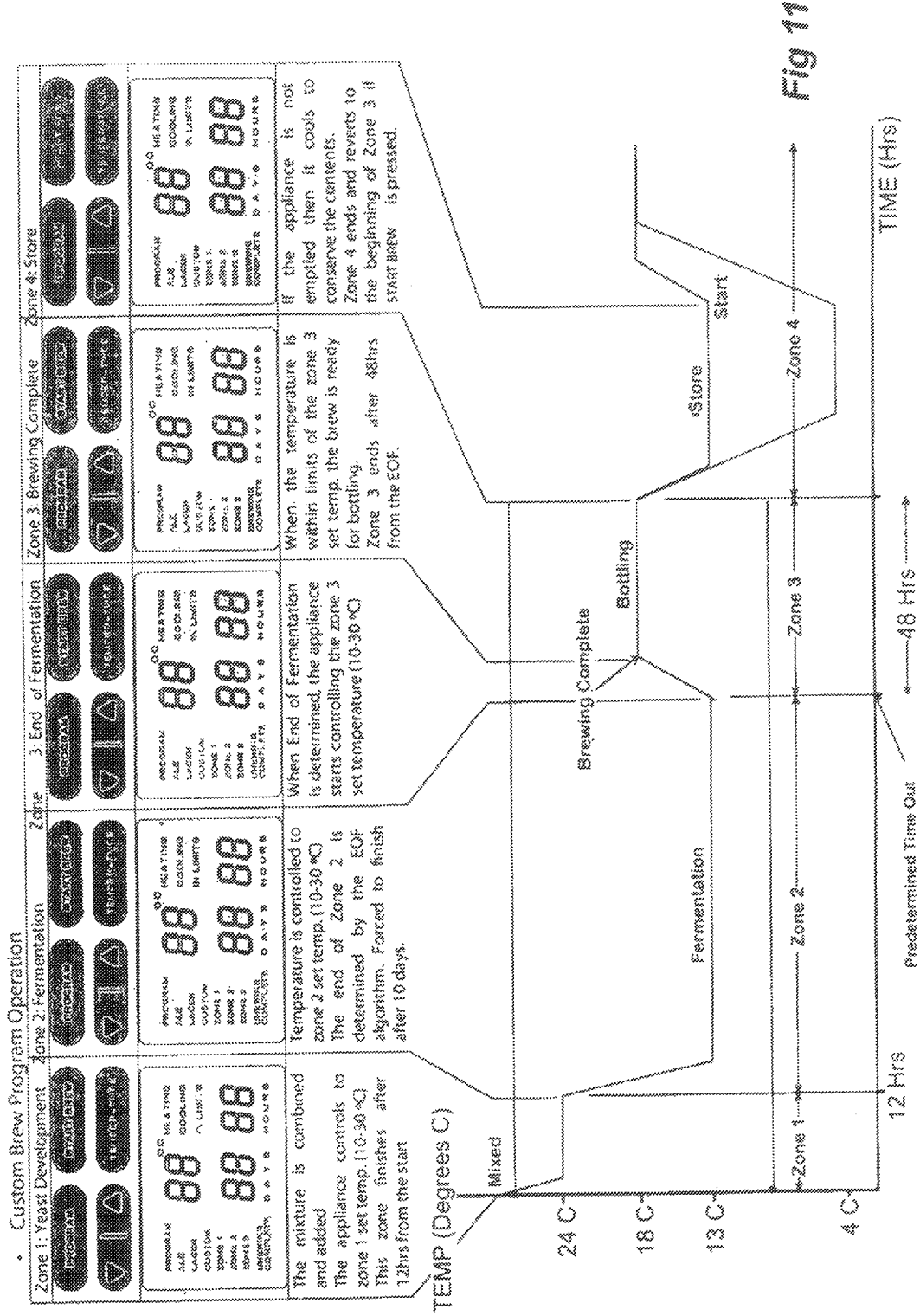
FIG. 11 depicts a series of displays of the Custom brew program in operation.

Once the user presses the START BREW button, the brew commences, and the control device 60 maintains the temperature of the brew at the temperature prescribed by the selected program (see the above table). FIGS. 9 to 11 provide timelines for the ale, lager and custom programs respectively (note that the temperature timeline for the custom program can vary, and the example given in FIG. 11 is illustrative only).

During Zone 1 the arrangement controls the temperature at 24° C. and continues for 12 hours. Then, Zone 2 is entered, and the arrangement controls the temperature at the appropriate temperature for fermentation, as prescribed by the program. After the first four days, the temperatures of the brew at different heights are checked regularly, to check for end of fermentation. The check may be made every 12 or 24 hours, and it may excitation of the contents of the vessel by actively heating or cooling of the brew depending on the ambient temperature. After two consecutive detections of end of fermentation, the arrangement transitions to Zone 3. Note that there is a timeout function (e.g. after 10, 14 or 21 days, depending on the particular program or embodiment of the invention), which is used to transition to Zone 3 even if end of fermentation is not detected. Timeouts may occur for various reasons, such as where there is a problem with the brew, or where there is a problem with the detection algorithm or temperature sensors, such that end of fermentation cannot be accurately detected. Once Zone 3 is entered, the arrangement controls the temperature to bring it to 18° C., and once that temperature is achieved and also end of fermentation is detected the BREW COMPLETE indicator alights. This alerts the brewer to the fact that the brew is ready to be removed from the vessel 12.

However, if the brew is not removed and the arrangement is not turned off, then this may indicate that the brewer is not able to remove the brew from the vessel 12 for some reason. However, if the brew is not removed, it is likely to spoil. Accordingly, if the arrangement is in Zone 3 for a 48 hour period, the arrangement enters Zone 4 (storage mode). Although there is no specific Zone 4 indicator, the BREW COMPLETE indicator flashes during this portion of the process but only if end of fermentation is detected. In Zone 4, the temperature is lowered to a safe storage temperature which is nominally below 4° C. Zone 4 continues indefinitely until the START BREW button is pressed and held for a predetermined period (say 2 seconds) which forces the arrangement to the beginning of Zone 3 or the arrangement is manually switched OFF. In this way, the brew is maintained in a stable state (at a relatively low temperature), which helps to prevent the brew from spoiling.

Figure 12:
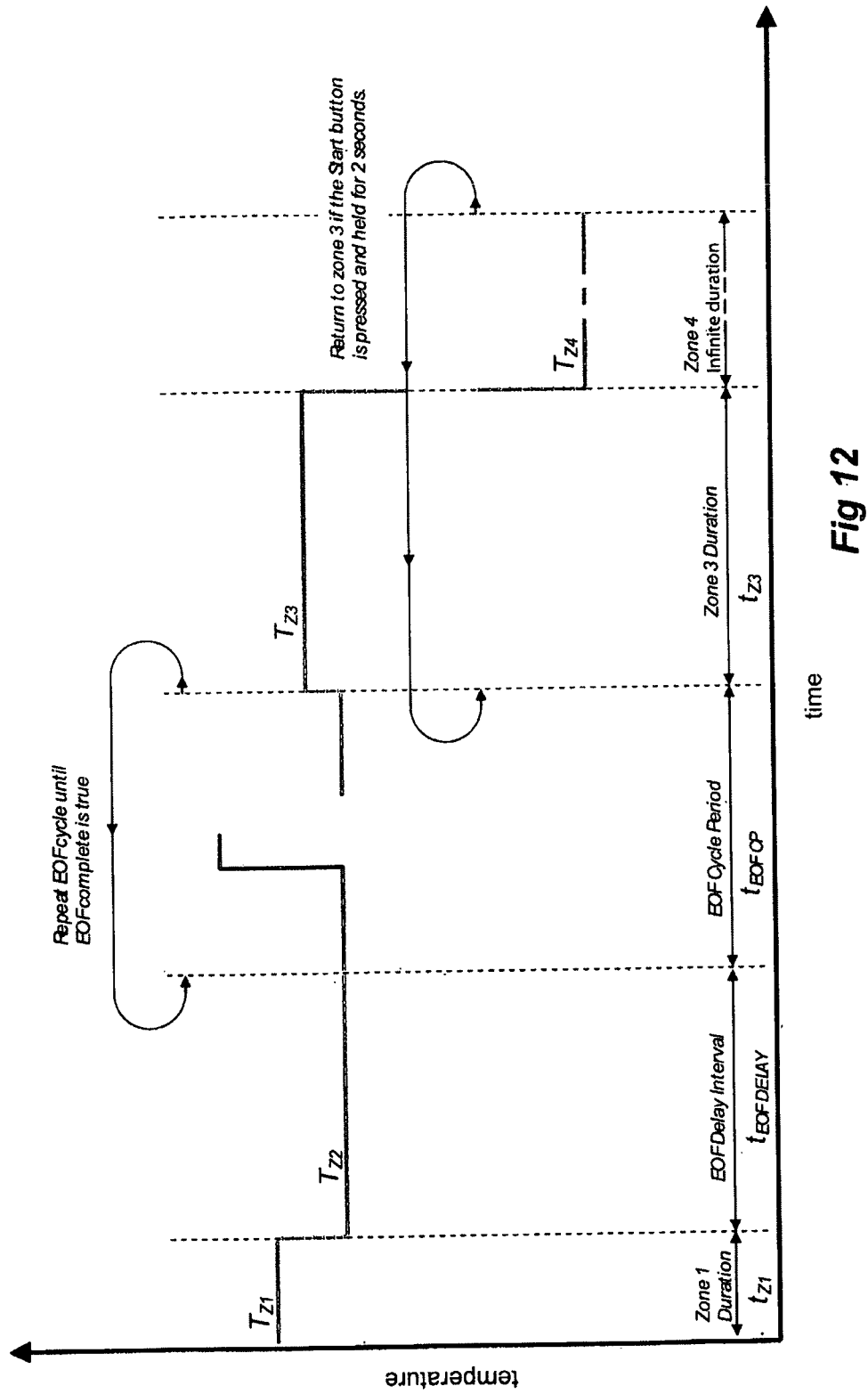
FIG. 12 depicts the end of fermentation detection process using temperature and time scales.
Figure 13:
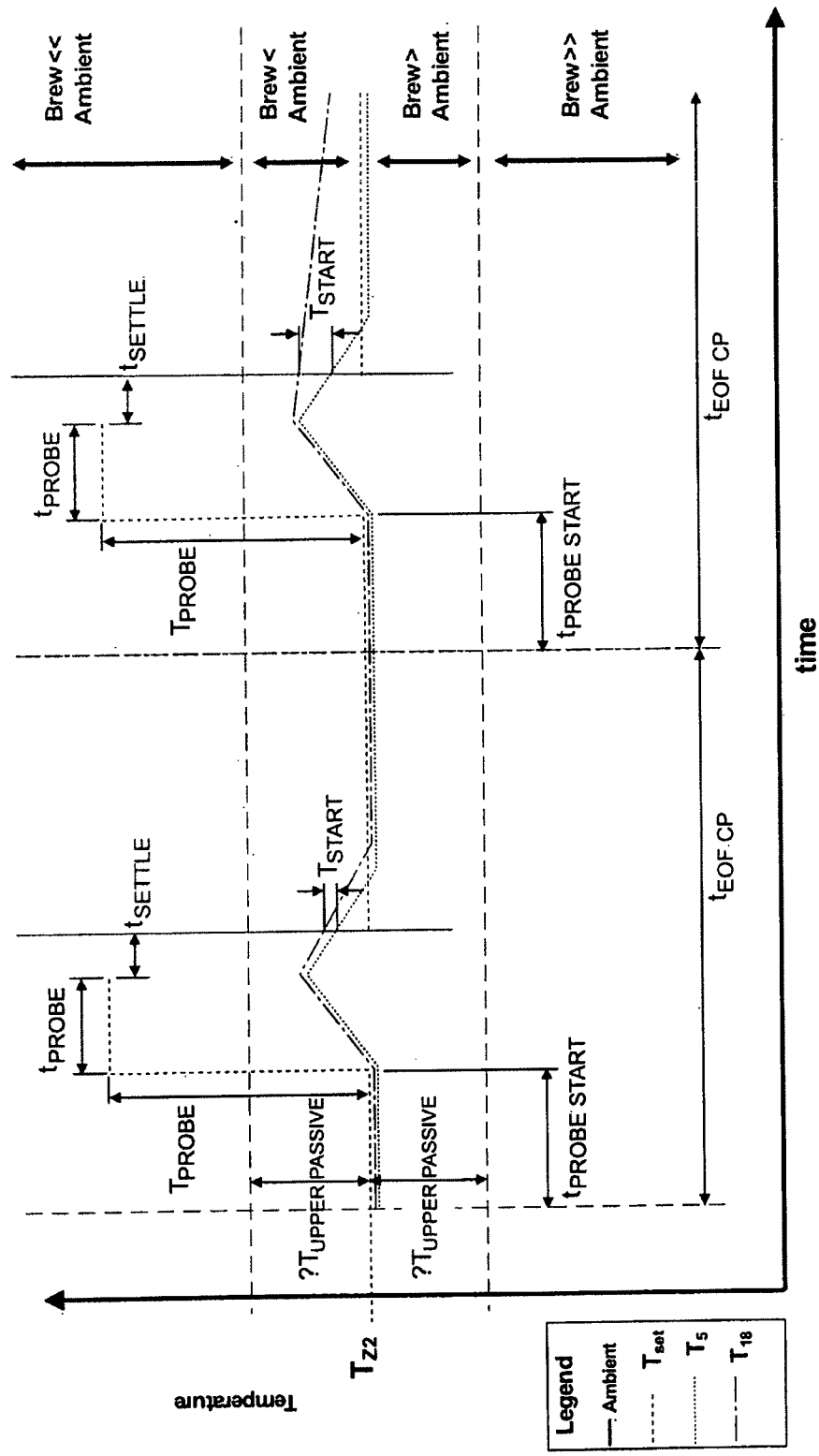
FIG. 13 depicts the end of fermentation detection process using temperature and time scales.

FIGS. 12 and 13 are timelines depicting the brew temperature changing over time, during e zones of the program. FIG. 12 is a basic timeline, illustrating that the end of fermentation testing cycle is repeated until end of fermentation test is true. A more detailed temperature profile is shown in FIG. 13, which shows temperature timelines of the T5 and T18 sensors, and also the temperature set according to the program. In the example shown in FIG. 13, a 'probing' implementation is also illustrated, whereby the brew is heated for a time period $t_{PROBE}$, for a temperature increase $T_{PROBE}$, and then is allowed to settle for a period $t_{SETTLE}$ before the temperature $T_{STRAT}$ (temperature difference between T5 and T18) is measured.

In FIG. 13, two ends to the fermentation cycles are shown. The first cycle shows the end of fermentation test as false, because the differential $\Delta t$ ($T_{STRAT}$) is less than the split threshold value, whereas for the second cycle, the end of fermentation test ist true because $\Delta t$ ($T_{STRAT}$) is greater than the split threshold value.

One surprising advantage of the implementation of Zone 4 (or at least a strong cooling mode) is that it allows the brewer to have further control over brewing different types of beer. In particular, Zone 4(storage mode) is useable to produce what is commonly referred to as a bock beer, which involves the creation of ice in the fermented brew before secondary fermentation, to produce a more concentrated alcohol by volume beer product. Whilst this is not expected to be a typical operation of the arrangement, it provides additional customisability for a brewer. They can produce a bock beer by setting the temperature control to a strong cooling mode (e.g. as in Zone 4) so that at least some of the fermented brew freezes around the settable energy device. This ice (being a portion of the fermented brew, a solid state) can then be removed from the brew. In one embodiment, the frozen portion is readily released from a smooth dome like formation on the inside base portion of the vessel by forcing the arrangement to control the brew to a higher temperature (e.g. by entering Zone 3 again)—once the frozen portion is released, it rises due to its lower specific gravity to the top of the brew, and can be readily removed. This will create a greater alcohol by volume content beer. It is also possible to reset the arrangement into Zone 3 to resuspend the yeast through warming convection, thus allowing the beer to have adequate yeast for secondary fermentation in the bottle.

The arrangement also preferably caters for unexpected power outages. Unexpected power supply interruption events are not uncommon, wherein the electricity supply experiences blackouts and brownouts which occur when the voltage of the electricity supply become greater or smaller respectively than the regulated supply is expected to be.

When these situations occur, the arrangement is programmed to simply pick up from where it was interrupted. This embodiment leaves it to the user to determine that there was an interruption, from their knowledge of the day and time when the fermentation process began in Zone 1 (the time display will only show the uninterrupted period since the beginning of Zone 1). A simple calculation will soon reveal what the period of interruption was—if the interruption period is significant, the elapsed time displayed will be significantly different to the real elapsed time, which could be used to draw the user's attention to the fact that the power interruption occurred. In any event, the user should smell and taste the brew to make their own assessment of the condition of the brew (regardless of any interruption period).

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications within its scope.

When the a temperature is referred to in this specification it will be appreciated that it is not an absolute measure of temperature, but a relative one based on the accuracy of the temperature detectors and one that is likely to be best understood by the brewer who has an intimate knowledge of their own brewing arrangement based on long use of one or multiple brews types in the same equipment.

What is claimed is:

1. A home brewing fermentation arrangement for fermenting a home brew for transfer to one or more containers for secondary fermentation, including:
    a vessel having an internal volume adapted to support fermentation of a home brew therein and a tap connected to the vessel for transfer of the fermented home brew from the internal volume to one or more containers for secondary fermentation;
    a settable energy device connected to the vessel to deliver and extract energy respectively to and from the internal volume of the vessel; and
    a temperature controller connected to the settable energy device for controlling the amount and period of energy delivery and extraction of the settable energy device to achieve a temperature within the vessel according to one of a plurality of modes of operation, wherein
    the plurality of modes of operation includes at least a fermentation mode, a bottling mode, and a storage mode,
    an end of fermentation detector includes a controller and is connected to the vessel for determining the end of fermentation of the home brew during the fermentation mode based on detected temperatures at different positions within the vessel,
    an indicator is connected to the end of fermentation detector to visually indicate that the end of the fermentation detector has determined the end of fermentation of the home brew, and
    the temperature controller is configured to adjust the temperature within the vessel so that the home brewing fermentation arrangement enters the bottling mode for a predetermined time period after either the end of fermentation is detected, or if no end of fermentation is detected, then by the end of a predetermined time out period, and during the bottling mode the temperature controller substantially holds the temperature at a predetermined bottling temperature and the indicator indicates that the end of fermentation was detected and the home brew is ready for transfer to the one or more containers for secondary fermentation, and after the predetermined time period, the temperature controller adjusts the temperature within the vessel so that the home brew fermentation arrangement automatically enters the storage mode to maintain the fermented home brew in a stable state, and the indicator indicates that the home brew is in the storage mode after the end of fermentation was detected.

2. The home brewing fermentation arrangement according to claim 1, wherein during the fermentation mode the temperature of the home brew is adjusted to and substantially held at a predetermined fermentation mode temperature for a predetermined fermentation mode period, and the end of the predetermined fermentation mode period is aligned with the end of the predetermined time out period.

3. The home brewing fermentation arrangement of claim 1, wherein the end of fermentation detector includes:
    a first temperature sensor positioned at a first height of the vessel; and
    a second temperature sensor positioned at a second height of the vessel,
    and wherein the end of fermentation is detected by measuring a difference between a temperature sensed by the first temperature sensor and a temperature sensed by the second temperature sensor, and comparing the difference to a threshold difference.

4. The home brewing fermentation arrangement of claim 3, further including:
    a third temperature sensor, for measuring an ambient temperature external to the arrangement.

5. The home brewing fermentation arrangement of claim 4, wherein the ambient temperature is used to set the threshold difference.

6. The home brewing fermentation arrangement of claim 4, wherein the ambient temperature is used by the temperature controller to alter the temperature within the vessel, prior to measuring the difference between the temperatures sensed by the first and second temperature sensors.

7. The home brewing fermentation arrangement of claim 1, wherein the predetermined time period is 48 hours.

8. The home brewing fermentation arrangement of claim 1, wherein the setting of energy in the storage mode is such as to maintain the fermented home brew substantially at −1 degrees Celsius.

9. The home brewing fermentation arrangement of claim 1, wherein the plurality of modes of operation further include a yeast development mode associated with yeast development at the start of the brewing process before the fermentation mode, and during the yeast development mode the temperature of the home brew is adjusted to and substantially held at a predetermined yeast development mode temperature for a predetermined yeast development mode period.

10. The home brewing fermentation arrangement of claim 9, wherein the yeast development mode temperature is 24 degrees Celsius, and the predetermined yeast development mode period is 12 hours.

11. A method of using a home brewing fermentation arrangement for fermenting a home brew for transfer to one or more containers for secondary fermentation as defined in claim 1, including:
  receiving a user input command to initiate a brew program for fermenting a home brew in the vessel of the home brewing fermentation arrangement, wherein the brew program comprises a plurality of modes of operation and during each mode a temperature controller connected to the vessel controls a settable energy device connected to the temperature controller to deliver and extract energy respectively to and from the internal volume of the vessel to achieve a temperature within the vessel according to the current mode of operation;
  entering a fermentation mode during which the home brew is maintained substantially at a set fermentation temperature;
  monitoring the home brew during the fermentation mode to identify the end of fermentation and entering a bottling mode for a predetermined time period after either the end of fermentation is detected based on the detected temperatures at the different positions within the vessel, or if no end of fermentation is detected, then by the end of a predetermined time out period;
  indicating the end of fermentation if the end of fermentation has been detected; and
  automatically entering a storage mode after the end of the predetermined time period, during which the fermented home brew is held at a temperature to maintain the fermented home brew in a stable state, and if the end of fermentation was detected, then indicating that the home brew is in the storage mode after the end of fermentation was detected.

12. The method of claim 11, wherein the predetermined timeout period begins from the time the user input command is received, and further including:
  entering a yeast development mode after receiving the user input command to initiate the brew program during which the temperature of the home brew is adjusted to and substantially held at a predetermined yeast development mode temperature for a predetermined yeast development mode period; and
  automatically entering the fermentation mode after the end of the predetermined yeast development mode period.

13. The method of claim 11, further including monitoring the home brew during the fermentation mode to identify the end of fermentation by:
  measuring a temperature difference between a temperature at a first height of the home brew and a temperature at a second height of the brew; and
  identifying the end of fermentation if the temperature difference is greater than a threshold difference.

14. The method of claim 13, further including:
  applying a pulse of temperature control to alter the temperature of the home brew, prior to measuring the temperature difference.

15. The method of claim 13, further including:
  removing temperature control prior to measuring the temperature difference.

16. The method according to claim 11, further including receiving a user input command during the storage mode and returning the home brewing fermentation arrangement to the bottling mode.

17. The home brewing fermentation arrangement of claim 1, wherein the bottling temperature is substantially 18 degrees Celsius.

18. The home brewing fermentation arrangement of claim 1, further including a user input for returning the home brewing fermentation arrangement to the bottling mode from the storage mode.

19. The home brewing fermentation arrangement of claim 1, wherein the home brew is maintained substantially at a set temperature for each mode of operation.

* * * * *